3,449,323
PROCESS FOR THE PRODUCTION OF
SULFENAMIDES
Joseph E. Dunbar, Midland, Mich., assignor to The Dow
Chemical Company, Midland, Mich., a corporation of
Delaware
No Drawing. Filed Oct. 4, 1965, Ser. No. 492,935
Int. Cl. C07d 87/46, 23/06; C07c 149/24
U.S. Cl. 260—239                                    4 Claims

ABSTRACT OF THE DISCLOSURE

A new process is claimed for preparing sulfenamides and sulfinic acid amine salts wherein a thiosulfonate corresponding to the formula

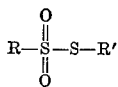

is reacted with an amine. Novel sulfenamides prepared by the new process are also claimed. In the formula, R represents alkyl or aryl, and R' represents R, allyl, or lower-alkylthio-lower-alkyl. The new compounds are useful as pesticides.

---

The present invention is directed to a new and novel chemical process for preparing sulfenamides and sulfinic acid amine salts and to new and novel sulfenamides prepared in accordance with the new process.

The new process of the present invention comprises reacting a thiosulfonate corresponding to the formula

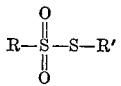

with an amine. In this and succeeding formulae, R represents alkyl or aryl, and R' represents R, allyl or lower alkylthio-lower-alkyl. In the present specification and claims, the term aryl is employed to refer to phenyl, or substituted phenyl or naphthyl or substituted naphthyl or any combination of said moieties wherein the substituents are halogen (chlorine or bromine), nitro, lower alkyl and lower alkoxy such as 4-bromo-1-naphthyl,
5-n-butyl-2-naphthyl,
4-ethoxyphenyl,
3,4,5-trichlorophenyl,
3,4-dimethylphenyl,
3,5-dinitrophenyl,
4,6-dinitro-1-naphthyl,
5,6-diethoxy-1-naphthyl,
4-n-butoxyphenyl and
3,4-dibromo-2-naphthyl.

Representative thiosulfonates include dodecyl dodecanethiolsulfonate,
4-n-butoxyphenyl propanethiolsulfonate,
3-methoxy-2-naphthyl heptanethiolsulfonate,
6-nitro-1-naphthyl benzenethiolsulfonate,
methyl 7-chloro-1-naphthylenethiolsulfonate,
1-naphthyl 2-naphthylenethiolsulfonate,
hexyl 4-isopropyl-1-naphthylenethiolsulfonate and
phenyl 3,5-dichlorobenzenethiolsulfonate.

The amines to be employed in accordance with the present teachings are benzylamine, cyclohexylamines, alkylamines, lower alkylene diamines and monocyclic heterocyclic amines, said heterocyclic amine containing from 3 to 7 atoms from the group consisting of carbon, nitrogen and oxygen in a fully saturated ring and said ring containing at least one nitrogen atom and no more than two atoms selected from the group consisting of nitrogen and oxygen. These amines correspond to the formula $H_nB$, wherein B represents the residue obtained by the removal of a hydrogen atom from each nitrogen atom in the amine, and $n$ represents the number of nitrogen atoms in the amine. Representative amines include dimethylamine,
diethylamine,
ammonia,
methylamine,
ethylamine,
isopropylamine,
dibutylamine,
hexylamine,
sec.-butylamine,
octylamine,
dodecylamine,
nonylamine,
butylamine,
N-methyl-N-dodecylamine,
dicyclohexylamine,
N-butyl-N-ethylamine,
ethylenediamine,
tetramethylenediamine,
propylenediamine,
di-n-dodecylamine,
heptylamine,
morpholine,
piperidine,
azetidine,
1,2-oxazetidine,
oxazolidine,
pyrrolidine,
hexamethyleneimine,
hexahydro-1,4-oxazepine and
heptamethyleneimine.

The term alkyl is employed in the present specification and claims to refer to the alkyl radicals containing 1 to 2 to 3 to 4 to 5 and up to and including 12 carbon atoms, inclusive, and the terms lower alkyl, lower alkoxy and lower alkylene refer to radicals containing from 1 to 2 to 3 to 4 carbon atoms, inclusive. Representative radicals include methyl, sec.-butyl, isopropyl, hexyl, heptyl, octyl, dodecyl, methoxy, n-butoxy, isopropoxy, ethoxy, propoxy, methylene, trimethylene, ethylene and tetramethylene.

In carrying out the process of the present invention, the thiolsulfonate and the amine are contacted together to produce a sulfenamide corresponding to the formula

and a sulfinic acid amine salt corresponding to the formula

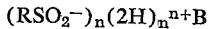

In the above formula, $(RSO_2^-)_n$ represents the sulfinic acid anion and $(2H)_n{}^{n+}B$ represents the amine cation. The process is believed to be represented by the following equation.

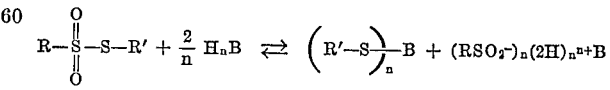

The reaction of the present inventon is conveniently carried out in the presence of an organic liquid as reaction medium. Representative organic liquids include diethyl ether, methylene chloride, benzene, methanol, ethanol, isopropanol, chloroform, xylene, toluene, acetone, nitromethane and methyl ethyl ketone. The reaction proceeds readily at temperatures at which the desired sulfenamide and the sulfinic acid amine salt products are formed. Convenient temperatures to be employed include temperatures between —30 and 150° C. with temperatures between 10 and 100° C. being preferred.

The proportions of the reactants to be employed are not critical. The process of the present invention results in the formation of at least a small quantity of the products when the reactants are contacted together in any proportion. In those cases in which the amine possesses only one nitrogen atom such as morpholine, piperidine, pentylamine, N-dodecyl-N-ethylamine, ammonia, benzylamine and cyclohexylamine, the reaction consumes the amine compound in molar quantities equivalent to two times the molar quantity of the thiolsulfonate compound consumed. In those cases in which the amine contains two nitrogen atoms each possessing replaceable hydrogen such as is the case in piperazine or ethylenediamine, the reaction consumes the reactants in essentially equimolar proportions.

The reaction of the present process is reversible. Accordingly, in a preferred procedure either the thiolsulfonate or the amine is employed in an amount in excess of the theoretical amount consumed in order to drive the reaction in the direction of improved yields of sulfenamide and sulfinic acid salt. In a convenient procedure, one of the starting materials and preferably the amine is employed in an amount equivalent to a one-fold excess with respect to the theoretical amount consumed. The use of the thiolsulfonate or the amine in an amount greatly in excess of the theoretical amount consumed has no adverse effect upon the process or the product formed. However, the use of a very large excess is not desirable from an economic viewpoint.

In carrying out the present invention the desired thiolsulfonate and the desired amine are contacted together in any desired order or fashion. In a convenient procedure, the reactants are combined in the presence of an organic liquid reaction medium. The temperature of the reaction mixture is maintained within the desired temperature range for a period of time. In some instances, the sulfinic acid amine salt will precipitate during the reaction as a crystalline solid. In such cases, cessation in the precipitation of the sulfinic acid amine salt is an indication of the completion of the reaction.

The sulfenamide and sulfinic acid amine salt are separated from the reaction mixture and each other, by conventional procedures. When the salt has precipitated during the reaction period, it can be removed by filtration or decantation. In those cases when the salt has not precipitated during the reaction period, the reaction mixture can be cooled, concentrated or diluted with a non-polar organic solvent such as diethyl ether in order to facilitate the precipitation of the salt. Once precipitated, the salt can be separated by filtration or decantation. In other instances, the sulfinic acid amine salt is sufficiently water soluble that it can be extracted from the reaction mixture and the water insoluble sulfenamide by washing the reaction mixture with water. Once the salt is separated from the reaction mixture, it can be further purified by recrystallization, washing with a non-polar organic solvent such as diethyl ether, etc.

The sulfenamide can be isolated from the reaction mixture by a variety of conventional procedures. The sulfenamide can be separated from salt-free or salt containing reaction mixture by fractional distillation. In an alternative method, the sulfenamide can be isolated from the salt-free reaction mixture by heating the reaction mixture to remove all of the low boiling constituents and obtain the sulfenamide as a residue. This residue can be further purified by washing, extraction with a solvent or crystallization of the product as a solid. Preferred sulfenamide compounds of the present invention are selected from the group N-(5,5,7,7-tetramethyl - 2 - octenylthio) - tert.-butylamine, 4-(allylthio)-morpholine, N-(o-nitrophenylthio)ethyleneimine and 4-[2-(methylthio)ethylthio]morpholine. These compounds are liquids or solids; they are of low solubility in water and of moderate solubility in many common organic solvents. These new sulfenamide compounds are useful as pesticides for the control of various insect, crustacean, bacterial, plant and fungal pests such as *Pullaria pullulans, Candida pelliculosa,* American cockroach, Daphnia, *Rhizoctonia solani, Actinomyces scabies, Fusarium solani phaseoli,* citrus green mold, tomato and sorghum/milo. The new compounds of the present invention are also useful as vulcanizing agents for the vulcanization of rubber.

The new sulfenamide compounds of the present invention are prepared according to the new process for preparing sulfenamides and sulfinic acid amine salts as described in the preceding paragraphs.

The following examples are merely illustrative and are not intended to be limiting.

Example 1.—4-(methylthio)morpholine (I) and morpholinium p-toluenesulfinate (II)

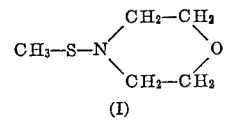

(I)

and

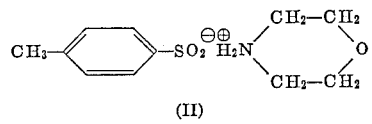

(II)

Methyl p-toluenethiolsulfonate (40.5 grams; 0.200 mole) and morpholine (34.8 grams; 0.400 mole) were dispersed in 250 milliliters of diethyl ether and the resulting dispersion maintained at room temperature for 15 hours. During the reaction period, the morpholinium p-toluenesulfinate product precipitated in the reaction mixture as a white crystalline solid. This white solid was collected by filtration and the resulting filtrate concentrated to yield more of the solid material which was likewise collected by filtration. The filtrate thus obtained was then diluted with diethyl ether to bring the total volume to 250 milliliters. The ether solution was then successively extracted with three 25 milliliter portions of water to remove any morpholinium p-toluene-sulfinate salt and any unreacted morpholine. The ether phase was then dried over anhydrous magnesium sulfate and the dried ether solution evaporated in vacuo to obtain a colorless water-insoluble, oily residue. This oily residue was fractionally distilled to obtain the liquid 4-(methylthio)morpholine product B.P. 48–49° C. at 5 mm. of Hg, $n_D^{25}$ 1.4978 and having carbon, hydrogen and nitrogen contents of 44.97, 8.22 and 10.37 percent, respectively, as compared to the theoretical contents of 45.08, 8.33 and 10.52 percent.

The white crystalline morpholinium p-toluene sulfinate produce obtained previously by filtration was washed with petroleum ether (60–70° C.), and recrystallized from benzene. The recrystallized morpholinium p-toluene-sulfinate product melted at 126–127.5° C. and had carbon, hydrogen and nitrogen contents of 54.51, 7.22 and 5.44 percent, respectively, as compared to the theoretical contents of 54.29, 7.04 and 5.76 percent.

Example 2.—1,4-bis(methylthio)piperazine (I) and 1,4-piperazinium di-p-toluenesulfinate (II)

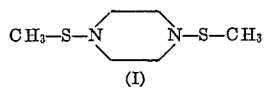

(I)

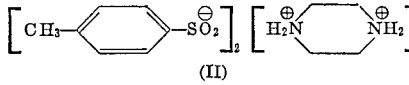

(II)

Anhydrous piperazine (17.2 grams; 0.200 mole) and methyl p-toluenethiolsulfonate (20.2 grams; 0.100 mole) were dispersed with stirring in 250 milliliters of benzene. Thereafter, the stirring was continued and the resulting reaction mixture heated at the boiling temperature and under reflux for two hours. Following the heating period, the reaction mixture was cooled to room temperature. During the cooling procedure, the 1,4-piperazinium di-p-toluenesulfinate product precipitated as a white crystalline solid which was separated from the reaction mixture by filtration. The filtered reaction mixture was distilled in vacuo to remove the low boiling constituents and obtain 1,4-bis(methylthio)piperazine as a colorless oil which crystallized when triturated with isopropanol. This crystalline product was collected by filtration and recrystallized from isopropanol. The recrystallized 1,4-bis(methylthio)piperazine produce melted at 140–142° C. and had carbon, hydrogen and nitrogen contents of 40.64, 7.84 and 15.83 percent, respectively, as compared to the theoretical contents of 40.41, 7.91 and 15.71 percent.

The solid 1,4-piperazinium di-p-toluenesulfinate product was recrystallized from isopropanol. The recrystallized product melted at 186–189° C. and had carbon, hydrogen, nitrogen and sulfur contents of 54.38, 6.77, 7.21 and 15.97 percent, respectively, as compared to the theoretical contents of 54.24, 6.58, 7.03 and 16.08 percent.

Example 3

Methyl p-toluenethiolsulfonate (4.05 grams; 0.0200 mole) and morpholine (3.48 grams; 0.0400 mole) were dispersed in 50 milliliters of ethyl ether which had been precooled to a temperature of −30° C. The reaction mixture thus formed was maintained at −30° C. for a period of 186 hours. During the reaction period, the morpholinium p-toluenesulfinate product precipitated in the reaction mixture as a colorless crystalline solid. This crystalline solid product was separated from the reaction mixture by filtration and washed with cold (temp. −30° C.) ethyl ether. The washed morpholinium p-toluenesulfinate product melted at 125–126.5° C. The infrared spectrum of the morpholinium p-toluenesulfinate product thus obtained was identical with the infrared spectrum of an authentic sample of morpholinium p-toluenesulfinate.

Example 4

Methyl p-toluenethiolsulfonate (40.5 grams; 0.200 mole) and piperidine (34.1 grams; 0.400 mole) were dispersed in 110 milliliters of methylene chloride. The resulting reaction mixture was allowed to stand at room temperature for one hour. Following the reaction period, the reaction mixture was fractionally distilled at reduced pressure to remove the methylene chloride and obtain an oily residue. The oily residue was collected and washed with 250 milliliters of ethyl ether. During the washing procedure, the piperidinium p-toluenesulfinate salt precipitated in the wash mixture as a crystalline solid, which was removed by filtration. The ethyl ether filtrate was then washed successively three times with water and dried over anhydrous magnesium sulfate. The solvent was then removed from the dried filtrate by evaporation in vacuo, leaving a light yellow, oily residue which was fractionally distilled at reduced pressure to obtain the 1-(methylthio)piperidine product as a liquid, B.P., 43–44° C. at 5 mm. of Hg, $n_D^{25}$ 1.4958 and having carbon, hydrogen and nitrogen contents of 55.31, 10.7 and 10.9 percent, respectively, as compared to the theoretical contents of 54.91, 9.98 and 10.68 percent.

The solid piperidinium p-toluenesulfinate product was recrystallized from a mixture of benzene and petroleum ether (60–70° C.) and found to melt at 74–77° C. and and to have carbon, hydrogen and nitrogen contents of 59.63, 8.20 and 5.85 percent, respectively, as compared to the theoretical contents of 59.72, 7.93 and 5.81 percent.

The following examples of the present invention are prepared as previously described.

4-(benzylthio)morpholine (melting at 74–76° C. and having carbon, hydrogen and nitrogen contents of 63.40, 7.26 and 6.45 percent, respectively, compared with the theoretical contents of 63.12, 7.22 and 6.69 percent) and the morpholinium p-toluenesulfinate by contacting morpholine and benzyl p-toluenethiolsulfonate.

4-(amylthio)morpholine (B.P. 59–61° C. at 0.3 mm. of Hg, $n_D^{25}$ 1.4825 and having carbon, hydrogen and nitrogen contents of 57.38, 10.07 and 7.57 percent, respectively, as compared to the theoretical contents of 57.10, 10.12 and 7.40 percent) and morpholinium methanesulfinate by reacting together amyl methanethiolsulfonate and morpholine.

4-(allylthio)morpholine (B.P. 40–41° C. at 0.5 mm. of Hg, $n_D^{25}$ 1.5086 and having carbon, hydrogen, nitrogen and sulfur contents of 52.78, 8.16, 8.70 and 20.35 percent, respectively, as compared with the theoretical contents of 52.79, 8.23, 8.70 and 20.13 percent) and the morpholinium p-toluenesulfinate by reacting together allyl p-toluenethiosulfonate and morpholine.

N-methylthio-N,N-diethylamine (B.P. 126–7° C., $n_D^{25}$ 1.4510 and the infrared spectrum showed asymmetric and symmetric N-S-C stretching vibrations at 935 cm.$^{-1}$ and 677 cm.$^{-1}$, respectively) and diethylammonium p-toluenesulfinate by reacting together methyl p-toluenethiolsulfonate and diethylamine.

N - (5,5,7,7-tetramethyl-2-octenylthio)-tert.-butylamine ($n_D^{25}$ 1.4797 and having carbon and hydrogen contents of 70.89 and 12.17 percent, respectively, as compared to the theoretical contents of 70.78 and 12.25 percent) and the methyl sulfinic acid salt of tert.-butylamine by reacting together tert.-butylamine and 5,5,7,7-tetramethyl-2-octenyl methanethiolsulfonate.

4-(phenylthio)morpholine (melting at 33–36° C. and the infrared spectrum showing asymmetric and symmetric bands of N-S-C stretch vibrations at 930 cm.$^{-1}$ and 700 cm.$^{-1}$, respectively) and morpholinium benzenesulfinate by reacting together phenyl benzenethiolsulfonate and morpholine.

1,4-bis(phenylthio)piperazine (melting at 164–166° C. and having carbon, hydrogen and nitrogen contents of 63.63, 5.85 and 9.46 percent, respectively, as compared with the theoretical contents of 63.54, 6.00 and 9.26 percent) and 1,4-piperazinium dibenzenesulfinate by reacting together anhydrous piperazine and phenyl benzenethiolsulfonate.

4-(o-nitrophenylthio)morpholine (melting at 89–91° C.) and morpholinium benzenesulfinate by reacting together o-nitrophenyl benzenethiolsulfonate and morpholine.

N-(o-nitrophenylthio)benzylamine (melting at 59–61° C.) and benzylamine salt of benzenesulfinic acid by reacting together o-nitrophenyl benzenethiolsulfonate and benzylamine.

N-(o-nitrophenylthio)cyclohexylamine (melting at 50–52° C.) and the cyclohexylamine salt of benzenesulfinic acid by reacting together o-nitrophenyl benzenethiolsulfonate and cyclohexylamine.

N-(dodecylthio)cyclopentylamine (molecular weight 285.5) and the cyclopentylamine salt of ethanesulfinic acid by reacting dodecyl ethanethiolsulfonate and cyclopentylamine.

N - (benylthio)cyclohexylamine (molecular weight 221.4) and the cyclohexylamine salt of p-toluenesulfinic acid by reacting together benzyl p-toluenethiolsulfonate and cyclohexylamine.

N-(o-nitrophenylthio)ethyleneimine (melting at 41.5–42.5° C. and having carbon, hydrogen and nitrogen contents of 49.05, 4.15 and 13.98 percent, respectively, as compared with the theoretical contents of 48.97, 4.11 and 14.28 percent) and the ethyleneimine salt of benzenesulfinic acid by reacting together o-nitrophenyl benzenethiolsulfonate with ethyleneimine.

4-[2-(methylthio)ethylthio]morpholine (B.P. 99° C. at 1.2 mm. of Hg and having carbon, hydrogen and nitrogen contents of 43.77, 7.52 and 7.52 percent, respectively, as compared to the theoretical contents of 43.49, 7.82 and 7.25 percent, respectively) and morpholinium methanesulfinate were prepared by reacting together morpholine and β-(methylthio)ethyl methanethiolsulfonate.

N-[2-(methylthio)ethylthio]cycloheptylamine (molecular weight 219.4) and the cycloheptylammonium benzenesulfinate were prepared by reacting together cycloheptylamine and β-(methylthio)ethyl butanethiolsulfonate.

1-(benzylthio)-4-(methyl)piperazine (molecular weight 222.3) and N-(methyl)piperazinium butanesulfinate (molecular weight 222.4) by reacting together 4-(methyl)-piperazine and benzyl butanethiolsulfonate.

1,4-bis(hexylthio)piperazine (molecular weight 318.5) and 1,4-piperazinium dodecanesulfinate by reacting together piperazine and hexyl dodecanethiolsulfonate.

N - (1-naphthylthio)-N-methyl-N-decylamine (molecular weight 329.5) and the N-methyl-N-decylamine salt of butanesulfinic acid by reacting 1-naphthyl butanethiolsulfonate and N-methyl-N-decylamine.

N-(hexylthio)ethyleneimine (molecular weight 159.3) and the ethyleneimine salt of butanesulfinic acid (molecular weight 173) by reacting together ethyleneimine and hexyl butanethiolsulfonate.

N-(dodecylthio)-N,N-didecylamine (molecular weight 497.9) and the didecylamine salt of p-toluenesulfinic acid by reacting together didecylamine and dodecyl p-toluenethiolsulfonate.

N - (2 - methoxyphenylthio)hexylamine (molecular weight 239.4) and the n-hexylamine methanesulfinic acid salt by reacting n-hexylamine and 2-methoxyphenyl methanethiolsulfonate.

The compounds of the present invention or compositions or formulations containing the same can be applied to pests and their habitats and their food in parasiticidal amounts to obtain excellent controls and kills of many organisms. These compounds can be employed for the control of pests in paints, adhesives, ink, white water, wood pulp, cutting oils, soil and on plants. These compounds can be conveniently employed in liquid or dust formulations. In such uses, the compounds are modified with one or a plurality of adjuvants or helpers including water, organic solvents, petroleum oils, petroleum distillates, or other liquid carriers, surface active dispersing agents and finely divided solids such as chalk, talc or bentonite. In other embodiments, they can be employed as concentrates, and subsequently diluted with additional liquid or solid adjuvants to produce the ultimate treating composition.

The exact concentration of the sulfenamide compound to be employed in the treating composition is not critical and may vary considerably provided a pesticidal amount of effective agent is applied to the pest and/or its habitats. The concentration of toxicant in liquid compositions generally is from 1 to 50 percent by weight, concentrations up to 95 percent by weight are conveniently employed. In dusts, the concentration of the toxicant can be from about 1 to 10 percent by weight. In compositions to be employed as concentrates, the toxicant can be present in a concentration of from 5 to 98 percent by weight.

In representative operations, aqueous dispersions containing 4-(allylthio)morpholine at a concentration of 1000 parts per million by weight give substantially complete kills of American cockroach. In other operations aqueous compositions containing 4-[2-(methylthio)ethylthio]morpholine at a concentration of 1000 parts per million by weight give complete control of *Salmonella typhosa, Aspergillus terreus, Pullularia pullulans,* and *Candida pelliculosa*. In still further operations, aqueous compositions containing 4-(allylthio)morpholine, at a concentration of 500 parts per million by weight give complete kills of citrus green mold, *Actinomyces scabies, Fusarium solani phaseoli, Rhizoctonia solani* and *Cercosphora beticola*.

The thiolsulfonate compounds employed herein can be prepared by known methods. In such a known operation, a halo compound corresponding to the formula R′-halo wherein R′ is alkyl, allyl and alkylthioalkyl is reacted with an alkali metal salt of a thiosulfonic acid corresponding to the formula

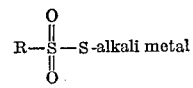

to produce the desired thiolsulfonate and the halide of reaction. The reaction is carried out in the presence of an inert organic liquid as reaction medium. Representative reaction mediums include dimethyl formamide, acetone, ethanol, aqueous acetone and aqueous ethanol. The reaction is carried out at temperatures between 25 and 150° C. Following the reaction period the desired product and the halide of reaction are separated from the reaction mixture by conventional procedures. In another representative procedure, an aryl sulfenyl chloride (R′—S—Cl) is reacted with an alkali metal sulfinate corresponding to the formula

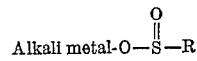

to produce the thiolsulfonate and the alkali metal halide of reaction. The reaction is carried out in an organic liquid reaction medium such as chloroform or carbon tetrachloride and at a temperature of between 0 and 30° C. The desired thiolsulfonate compound can be separated from the reaction mixture by conventional procedures.

I claim:
1. A process for producing a sulfenamide corresponding to the formula

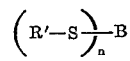

which comprises reacting together a thiolsulfonate corresponding to the formula

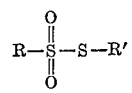

and an amine selected from the group consisting of benzylamine, cyclohexylamine, alkylamine, lower alkylene diamine and monocyclic heterocyclic amine, said heterocyclic amine containing from 3 to 7 atoms from the group consisting of carbon, nitrogen and oxygen in a fully saturated ring and said ring containing at least one nitrogen atom capable of reacting with the thiolsulfonate and no more than two atoms selected from the group consisting of nitrogen and oxygen, wherein in said formulas R represents a member of the group consisting of alkyl, phenyl, substituted phenyl, naphthyl and substituted naphthyl, wherein the substituents are selected from chloro, bromo, nitro, lower alkyl and lower alkoxy, R′ represents a member of the group consisting of R, allyl and lower alkylthio lower alkyl, B represents the residue of said amine following the removal of a hydrogen atom from each nitrogen atom in said amine and n represents the number of nitrogen atoms in the amine, at a temperature at which the sulfenamide and the sulfinic acid amine salt product are formed.

2. The process of claim 1 wherein the amine is an alkylamine.

3. The process of claim 1 wherein the amine is selected from the group consisting of a monocyclic heterocyclic amine.

4. A compound selected from the group consisting of 4 - (allylthio)morpholine, 4 - (o-nitrophenylthio)ethyleneimine, N-(5,5,7,7,-tetramethyl-2-octenylthio)-tert.-butylamine and 4[2-(methylthio)ethylthio]morpholine.

References Cited

UNITED STATES PATENTS 2,460,393  2/1949  Paul _____ 260—551

HENRY R. JILES, *Primary Examiner.*

H. I. MOATZ, *Assistant Examiner.*

U.S. Cl. X.R.

260—247.1, 551, 268, 293.4, 307, 326.82, 333, 453, 501.1, 999; 424—244, 248, 250, 256, 267, 274, 320